(12) United States Patent
Iwashita (10) Patent No.: US 6,601,751 B2
(45) Date of Patent: Aug. 5, 2003

(54) METHOD AND APPARATUS FOR JOINING (75) Inventor: Tomoyuki Iwashita, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/837,427

(22) Filed: Apr. 19, 2001

(65) Prior Publication Data

US 2001/0038028 A1 Nov. 8, 2001

(30) Foreign Application Priority Data

Apr. 28, 2000 (JP) ........................................ 2000-130040

(51) Int. Cl.[7] ............................ B23K 20/12; B23K 31/02
(52) U.S. Cl. ....................................... 228/112.1; 228/2.1
(58) Field of Search ............... 228/2.1, 2.3, 112.1–114.5

(56) References Cited

U.S. PATENT DOCUMENTS

| 5,460,317 A | * | 10/1995 | Thomas et al. | 228/112.1 |
|---|---|---|---|---|
| 5,697,544 A | * | 12/1997 | Wykes | 156/580 |
| 5,713,507 A | * | 2/1998 | Holt et al. | 228/112.1 |
| 5,735,446 A | * | 4/1998 | White et al. | 228/114.5 |
| 5,769,306 A | * | 6/1998 | Colligan | 228/112.1 |
| 5,794,835 A | * | 8/1998 | Colligan et al. | 228/13 |
| 5,813,592 A | * | 9/1998 | Midling et al. | 156/580 |
| 5,893,507 A | * | 4/1999 | Ding et al. | 156/580 |
| 5,979,742 A | * | 11/1999 | Enomoto et al. | 228/112.1 |
| 6,019,013 A | * | 2/2000 | Luik | 74/490.01 |
| 6,045,027 A | * | 4/2000 | Rosen et al. | 228/112.1 |
| 6,045,028 A | * | 4/2000 | Martin et al. | 228/112.1 |
| 6,050,474 A | * | 4/2000 | Aota et al. | 156/73.5 |
| 6,199,745 B1 | * | 3/2001 | Campbell et al. | 228/112.1 |
| 6,290,117 B1 | * | 9/2001 | Kawasaki et al. | 228/112.1 |
| 6,299,048 B1 | * | 10/2001 | Larsson | 228/112.1 |
| 6,299,050 B1 | * | 10/2001 | Okamura et al. | 228/110.1 |
| 6,325,273 B1 | * | 12/2001 | Boon et al. | 228/112.1 |
| 6,360,937 B1 | * | 3/2002 | De Koning | 228/112.1 |
| 6,367,681 B1 | * | 4/2002 | Waldron et al. | 228/112.1 |
| 2001/0045447 A1 | * | 11/2001 | Kano et al. | 228/112.1 |

FOREIGN PATENT DOCUMENTS

| DE | 197 31 638 A 1 | * | 1/1999 |
|---|---|---|---|
| JP | 2712838 | | 10/1997 |
| JP | 411047959 A | * | 2/1999 |
| WO | WO 01/28731 A1 | * | 4/2001 |
| WO | WO 01/28732 A1 | * | 4/2001 |

* cited by examiner

*Primary Examiner*—Tom Dunn
*Assistant Examiner*—Zidia Pittman

(57) ABSTRACT

At least two materials are superposed and a rotary tool 1 is pressed on a first material W1 at an outermost surface, whereby metal texture between the superposed first and second materials W1, W2 is agitated by frictional heat in a melting condition to join the materials.

3 Claims, 14 Drawing Sheets

METHOD AND APPARATUS FOR JOINING

FIELD OF THE INVENTION

The present invention relates to a method and an apparatus for joining plate materials made of aluminum alloy or pressed materials.

BACKGROUND OF THE INVENTION

In conventional joining technique, plate materials or materials pressed in advance in a three dimensional shape are superposed to be joined by electric resistance welding, arch welding, adhesives, bolt tightening or rivets.

When the materials are in the complex three dimensional shape, spot welding is used which can locally join a plurality of scattered joining portions.

Another joining technique is disclosed in Japanese Patent No. 2712838 which is a joining method by frictional agitation in a non-melting condition. This joining technique is such that a projection called a probe is rotatably inserted and translated in a joining surface of butted two members to plasticize metal texture near the joining surface by frictional heat and to thereby effect joining.

In the above spot welding, an optimal welding condition is selected to be set depending upon each welding portion when the materials are in the complex three dimensional shape or have different thickness or quality. This requires a large transformer and voltage source for applying high voltage on a welding electrode, and a circulating system of a cooling medium for cooling the transformer, involving immense investment in equipment.

In the joining technique disclosed in the above patent, the probe is inserted in the surfaces of the metal members to be moved so that welding marks (holes) from which the probe is pulled out are left at starting and ending points on a moving trace of the probe. This causes a problem in appearance that the technique cannot be used for areas where the welding marks are in sight and requires forming in advance a pad so as to remove the welding marks in post treatment and setting the starting and ending points of the probe on the pads.

SUMMARY OF THE INVENTION

The present invention is made in view of the above problems and its object is to provide a method and an apparatus for joining which requires small investment in equipment and can firmly join materials without leaving joining marks.

In order to solve the above problems and achieve the above object, according to first to third, eighth and ninth aspects of the present invention, moving frictional agitating means having a projection at an end portion thereof and rotating around an axis thereof to scattered joining portions, and joining the materials by pressing the projection on the joining portion permit joining materials which is press formed in advance in a three dimensional shape and cannot effect continuous joining with small investment in equipment without leaving welding marks.

According to fourth aspect of the present invention, rotating said frictional agitating means to press the end portion thereof on the joining portion, inserting the projection in the materials and agitating the materials by friction in a non-melting condition to join the materials permits joining with heat distortion restrained.

According to fifth and eleventh aspects of the present invention, a receiving member is provided opposite the frictional agitating means such as to grip the materials with the agitating means, and the agitating means and receiving member are mounted to an end of an arm of a multiarticulated robot movably in three dimensions, whereby the plurality of scattered joining portions can be locally joined even when the materials are in the complex three dimensional shape.

According to sixth aspect of the present invention, the projection is extensibly provided so that satisfactory joining can be achieved even when total thickness is large and when many materials are superposed.

According to seventh aspect of the present invention, the frictional agitating means is arranged opposite each other with the materials therebetween and grips the materials by tips of the mutually opposed frictional agitating means to be pressed, whereby joining time can be shortened and whereby satisfactory joining can be achieved even when the total thickness is large or many materials are superposed.

According to tenth aspect of the present invention, rotating the frictional agitation means to press on the end portion thereof on the superposed materials, inserting the projection in the materials and agitating the materials by friction in the non-melting condition to join the materials permits joining with the heat distortion restrained.

According to twelfth aspect of the present invention, pressing the frictional agitating means from a thinner side of the superposed materials permits joining with high capability of agitation even when the materials have different thickness.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Embodiments of the present invention will be described below in detail with reference to the drawings.

Figure 1:
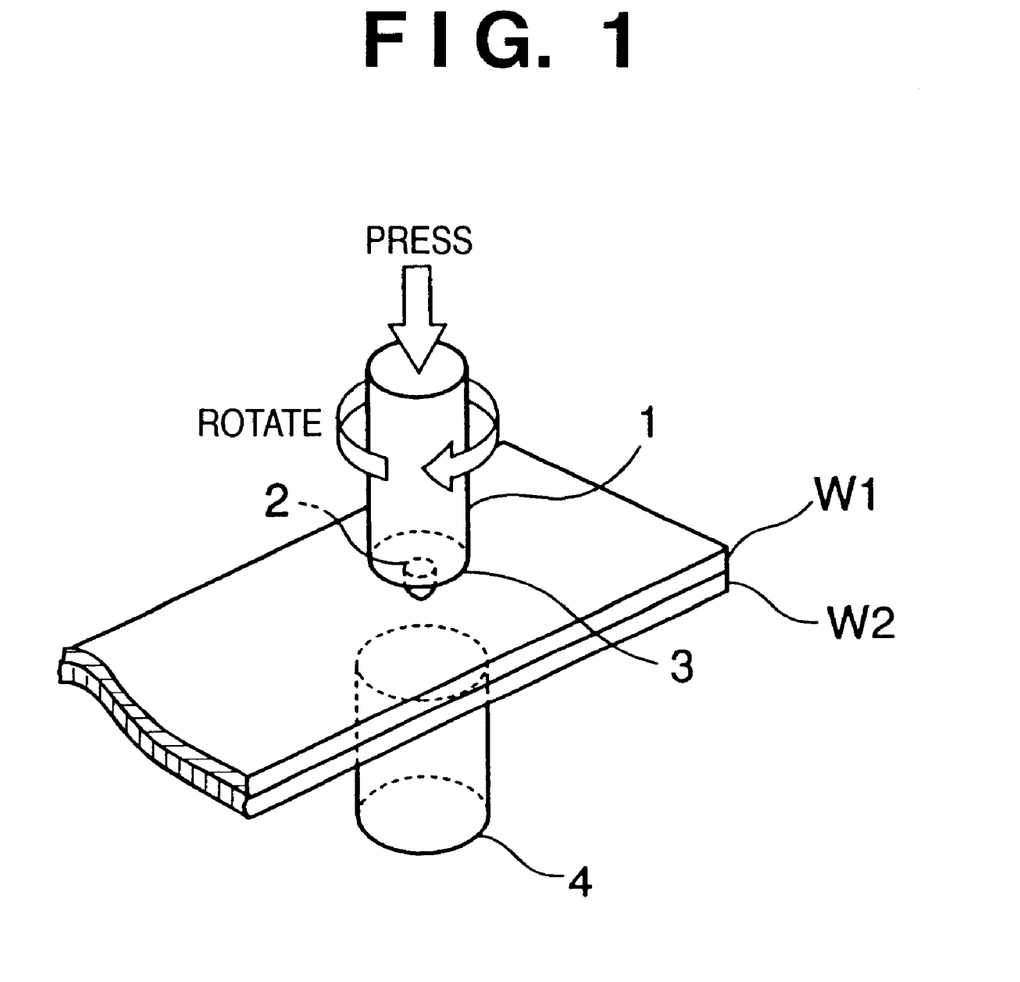
FIG. 1 is an enlarged view of a periphery of a rotary tool which explains a joining method of an embodiment according to the present invention.
Figure 2:
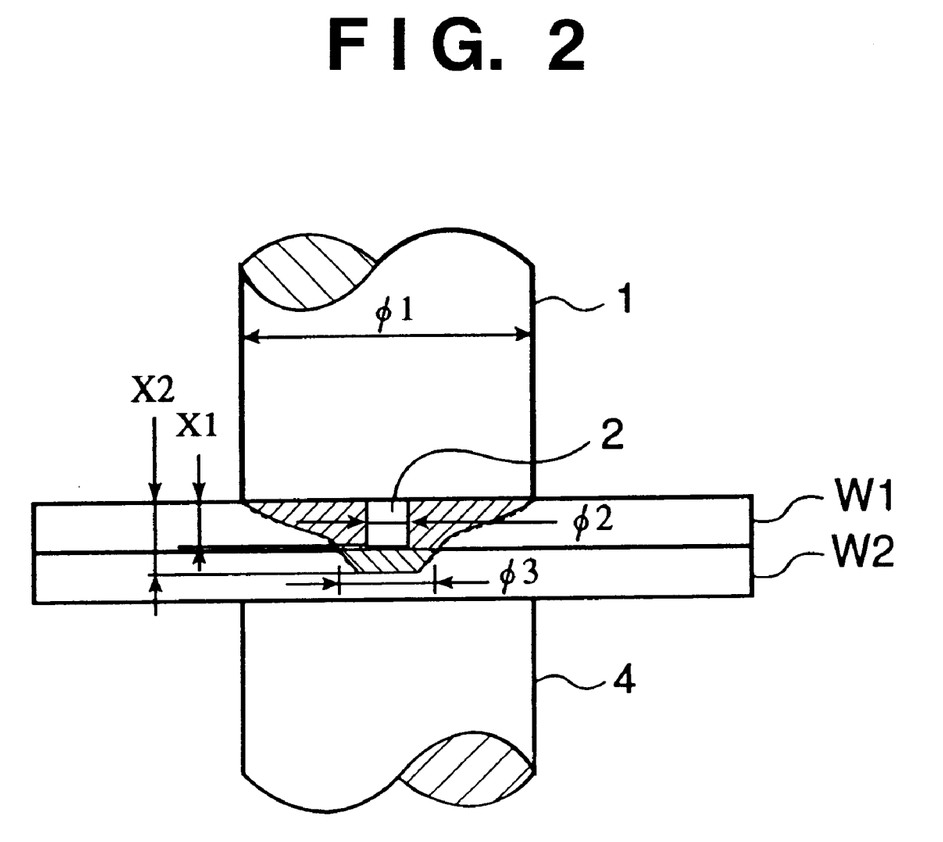
FIG. 2 is a cross sectional view of metal texture of a joining portion of FIG. 1.

FIG. 1 is an enlarged view of a periphery of a rotary tool which explains a joining method of the embodiment according to the present invention. FIG. 2 is a cross sectional view of metal texture of a joining portion of FIG. 1.

The joining method of this embodiment is applied to joining of a plate material made of aluminum alloy or a material press formed in a three dimensional shape in advance and is such that at least two materials are superposed and a rotary tool 1 is pressed on a first material W1 at an outermost surface to agitate metal texture between the superposed first and second materials W1, W2 by frictional heat in a non-melting condition to effect joining.

Such non-melting agitation can solve problems of heat distortion which occurs in electric resistance welding or the like.

The condition of the non-melting agitation mentioned above means that the metal texture is softened to be agitated by the friction heat at a temperature lower than the lowest melting point of the melting points of respective components or eutectic compounds contained in base materials.

As shown in FIG. 1, the joining method by the frictional agitation comprises the steps of superposing at least two materials W1, W2, rotating the cylindrical rotary tool 1 having a projection 2 at its end portion 3 around its axis to press the end portion 3 on the first material W1 at the outermost surface, inserting the projection 2 in the material, and agitating the superposed first and second materials W1, W2 by the friction in the non-melting condition to join the materials.

A receiving member 4 is arranged opposite the end portion 3 of the rotary tool 1 so as to grip the first and second materials W1, W2. An outer diameter of the receiving member 4 is designed to be larger than that of the rotary tool 1.

A diameter φ1 of the rotary tool 1 is approximately 10 to 15 mm, a diameter φ2 of the projection 2 is approximately 5 to 7.5 mm and a diameter φ3 of the joining portion is approximately 8 to 9 mm.

The rotary tool 1 and receiving member 4 are tools of non-friction type which are made of steel products (such as hard metals) harder than the joining material, while the joining material is not limited to the aluminum alloy if softer than the rotary tool 1.

A length of projection X1 is set to be 80 to 90% of a depth of joining portion X2 which is 1.1 to 1.2 times of the length of projection X1. The depth of joining portion X2 is increased in proportion to the length of projection X1 (1.1 to 1.2 times of a length of a pin).

The rotary tool 1 is rotatably mounted to an arm a below-mentioned multiarticulated robot 10 and configured such as to join a plurality of scattered joining portions in a spotting manner (locally) in case of the materials in a complex three dimensional shape.

Figure 3:
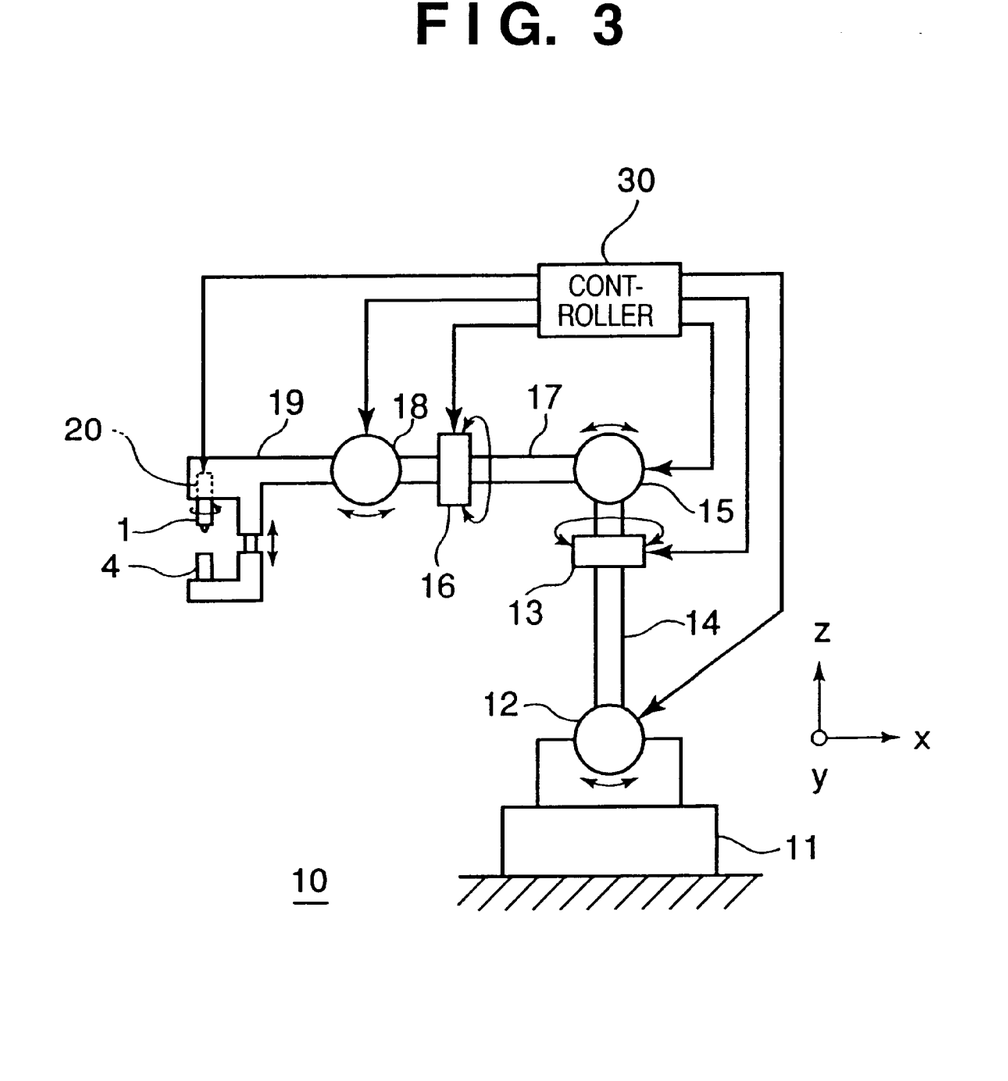
FIG. 3 is a schematic view of a multiarticulated robot for holding and driving the rotary tool.

FIG. 3 is a schematic view of the multiarticulated robot for holding and driving the rotary tool.

As shown in FIG. 3, the multiarticulated robot 10 comprises a first arm 14 which is connected to a joint 12 provided on a base 11 to be oscillated around a y-axis and to be rotated around a Z-axis at a joint 13, a second arm 17 which is connected to the first arm 14 via a joint 15 to be oscillated around a y-axis and to be rotated around an x-axis at a joint 16, and a third arm 19 which is connected to the second arm 17 via a joint 18 to be oscillated around a y-axis.

The third arm 19 is provided with a motor 20 to which the rotary tool 1 is rotatably mounted and which rotatably drives the rotary tool 1 and the receiving member 4 arranged opposite the end portion 3 of the rotary tool 1. A space between the end portion 3 of the rotary tool 1 and an end portion of the receiving member 4 is variable by an actuator 22, which is a design for dealing with a pressing force against the materials in joining or more than three superposed materials.

Each movement of the arm, motor and actuator is controlled by a controller 30 which takes a teaching thereof in advance.

The pressing force of the rotary tool 1 against the materials is set depending upon each jointing portion based on the total thickness or superposing number of the materials and can be applied to the case where the materials have respectively different thickness.

Figure 4:
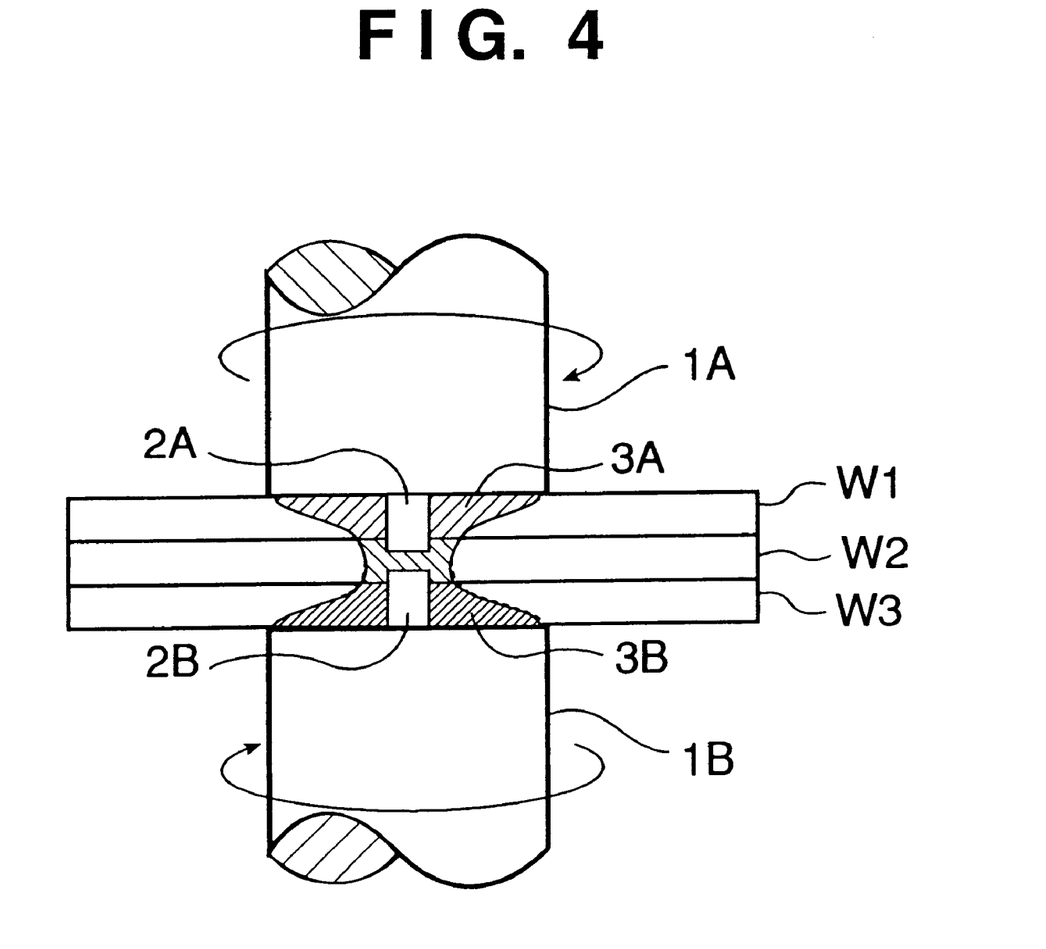
FIG. 4 is a cross sectional view of the metal texture of the joining portion at the time when more than three materials are joined.

As shown in FIG. 4, when more than three first to third materials W1 to W3 are joined, the materials are gripped by a pair of rotary tools 1A, 1B having the same outer diameter to be joined. In this case, the rotary tool 1B instead of the receiving member 4 in FIG. 3 is rotatably mounted to the multiarticulated robot 10, the first to third materials W1 to W3 are gripped by tips 3A, 3B of the rotary tools 1A, 1B opposed each other to insert projection 2A, 2B in the materials and to rotate each of the rotary tool 1A, 1B in an opposite direction.

Figure 5:
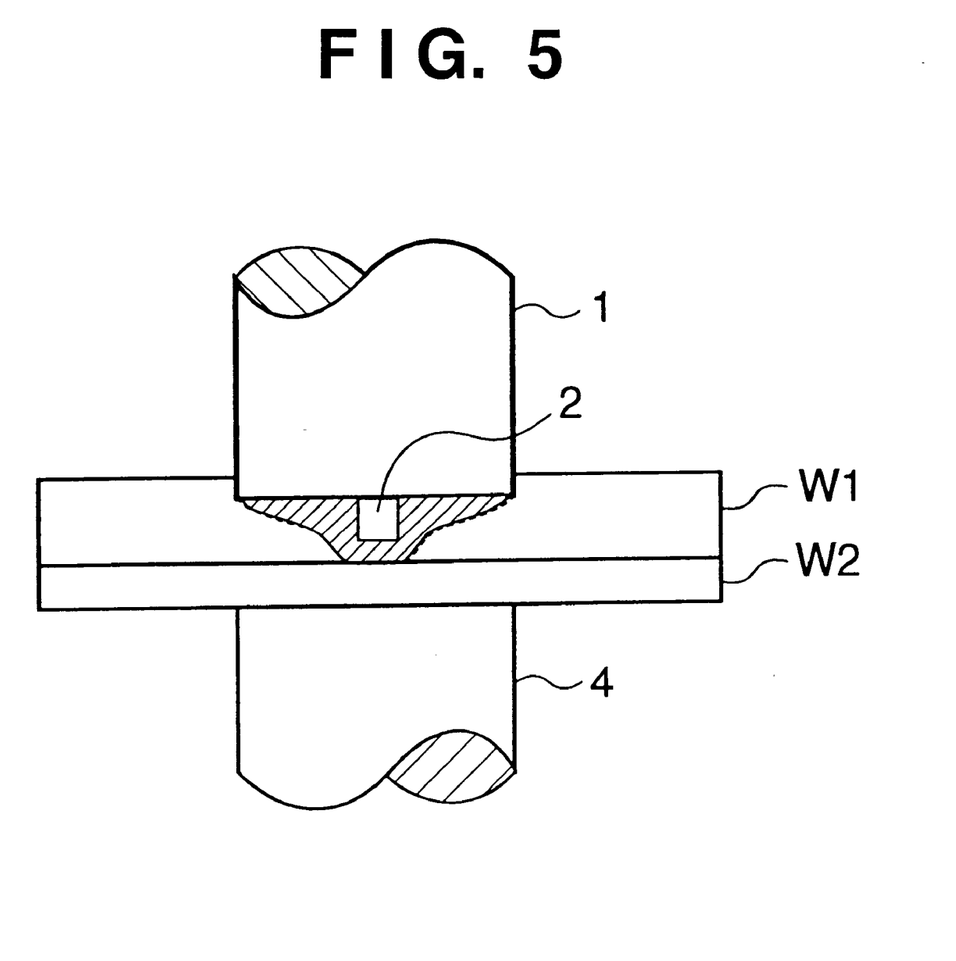
FIG. 5 is a cross sectional view of the metal texture of the joining portion at the time when the materials have respectively different thickness.

As shown in FIG. 5, the first and second materials having different thickness can be joined. Especially, pressing the rotary tool 1 from the thinner material side facilitates agitation to thereby achieve even joining.

[Plastic Flow of Metal Texture in Joining]

Figure 6:
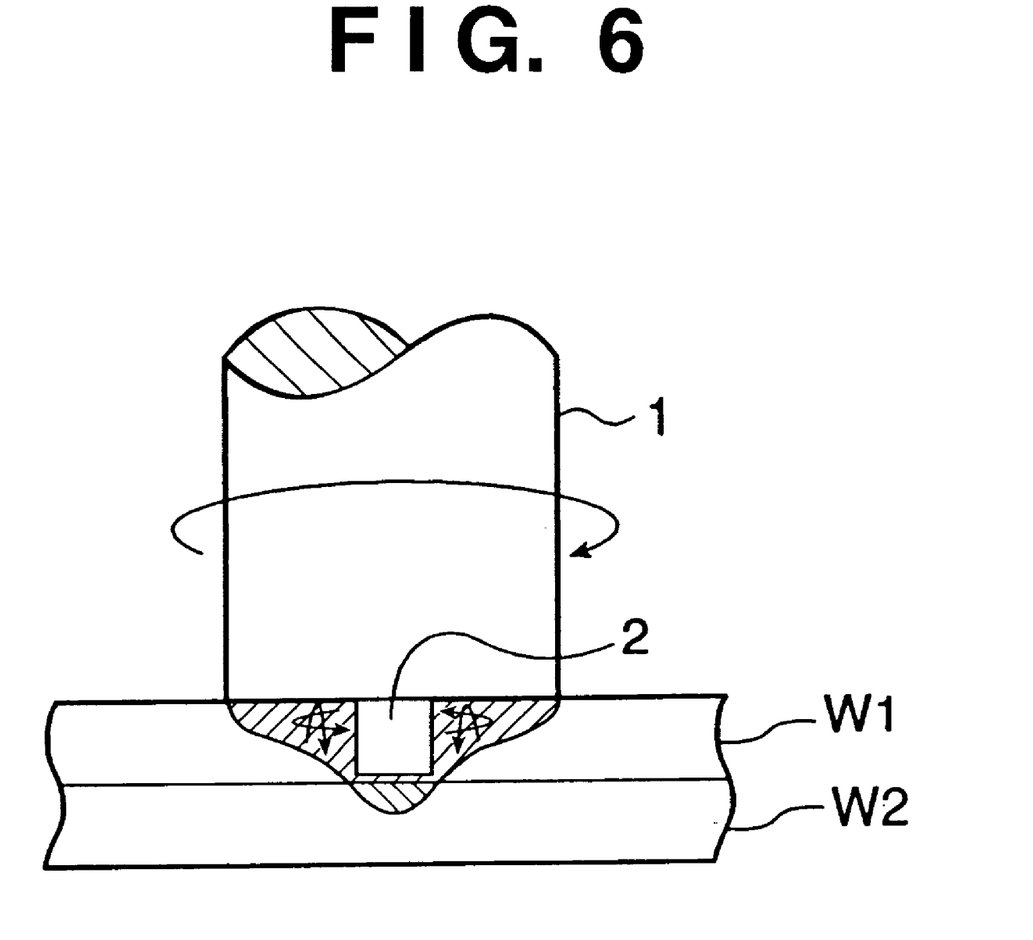
FIG. 6 is a view showing a condition of plastic flow in the material by the rotary tool.

FIG. 6 is a view showing a condition of plastic flow in the material by the rotary tool.

As shown in FIG. 6, pressing the rotary tool 1 rotating at predetermined speed of rotation substantially vertically on the first metal member W1 causes the friction between the rotary tool 1 and the first material W1 to soften the surface of the first material W1 so that the metal texture between the first and second materials W1, W2 are agitated in the non-melting condition in a rotational direction. As the pressing force against the first metal member W1 by the rotary tool 1 is increased, the second material W2 out of contact with the rotary tool 1 is started to be agitated together. At this time, the metal texture of the first and second materials W1, W2 are agitated in the rotational direction of the rotary tool 1 and also agitated in a direction of the thickness (in a direction perpendicular to the joining surface of the first and second materials W1 and W2) at the projection 2, and the superposed first and second materials W1 and W2 are finally joined without being melt.

In this way, the projection 2 of the rotary tool 1 facilitates the plastic flow of the metal texture to be agitated.

[Results of a Test]

In the joining process of this embodiment, used as materials to be joined are, for example, a 5000 series alloy plate (Al—Mg alloy plate) or 6000 series alloy plate (Al—Mg—Si alloy plate) standardized by JIS, however, other metal materials can be applied.

Figure 7:
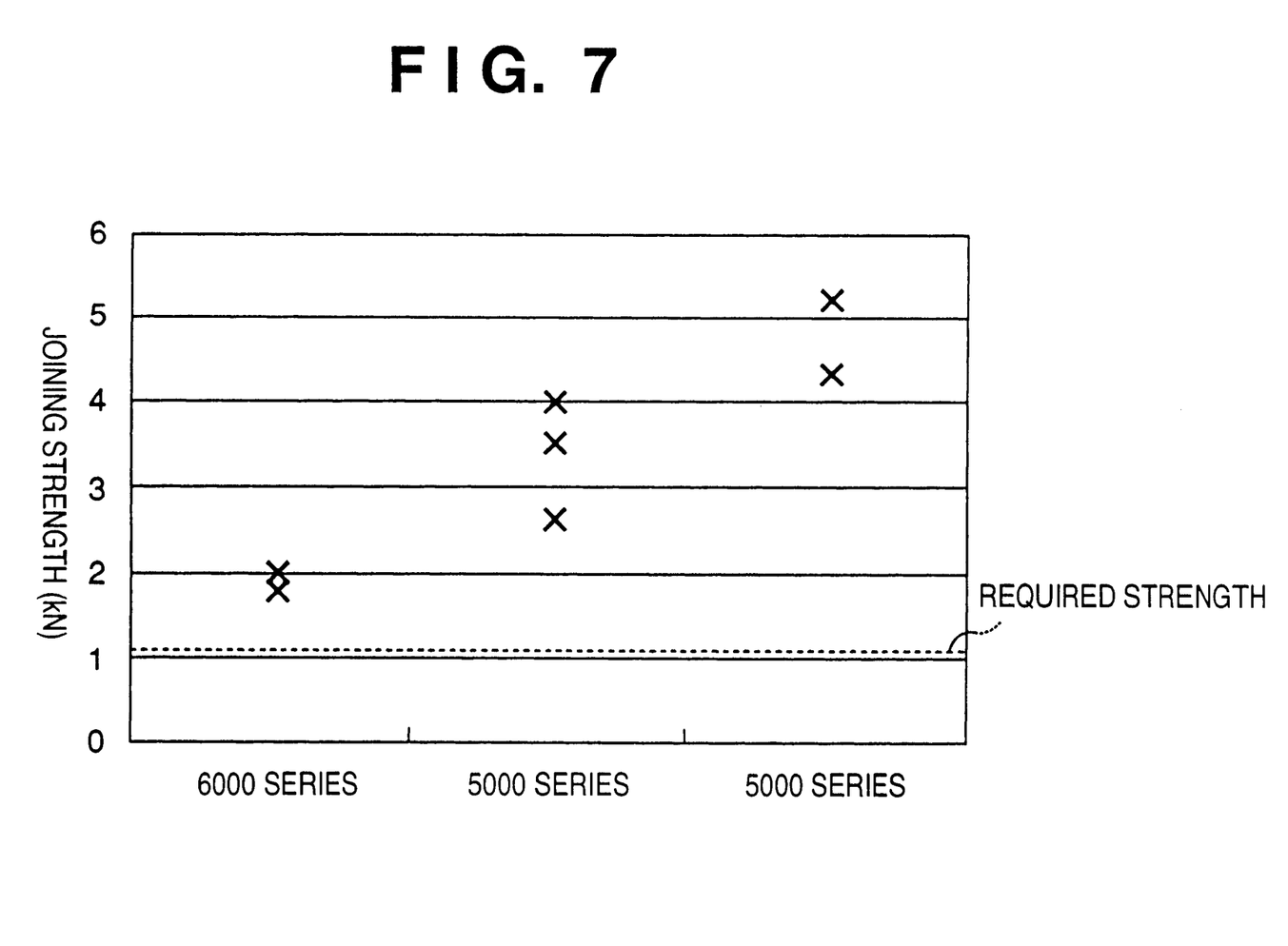
FIG. 7 is a view showing results of a test of joining strength by different materials.
Figure 8:
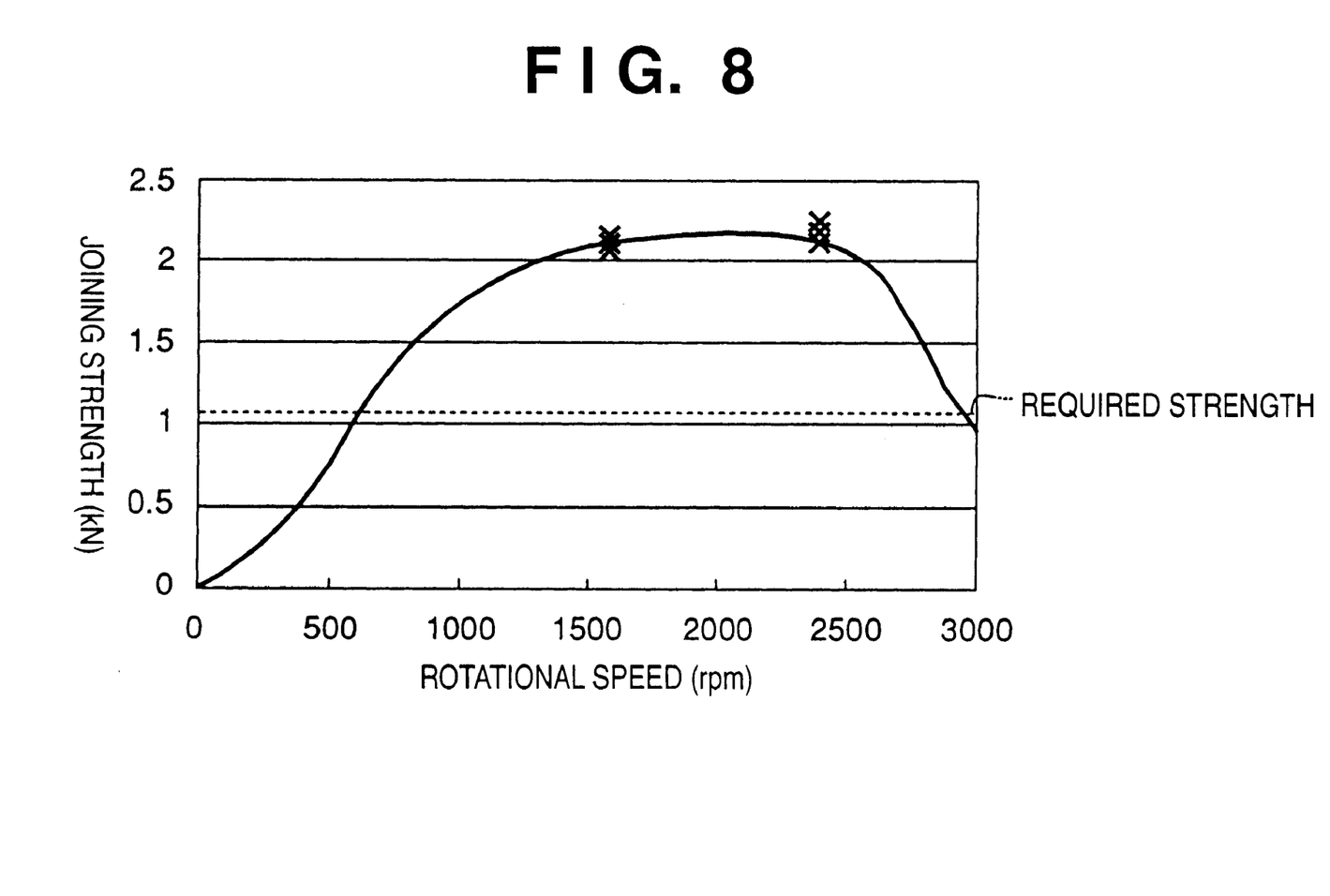
FIG. 8 is a view showing results of a test of a relationship between rotation speed of the rotary tool and the joining strength.

FIG. 7 is a view showing results of a test of joining strength by different materials. FIG. 8 is a view showing results of a test of a relationship between rotation speed of the rotary tool and the joining strength.

In the test of the joining strength of FIG. 7, the joined materials are mutually pulled in opposite directions to measure a tensile force at the time when the joining surfaces are separated as the joining strength.

As shown in FIG. 7, both 5000 series alloy plate (Al—Mg alloy plate) and 6000 series alloy plate (Al—Mg—Si alloy plate) are joined at a strength higher than a required strength.

As shown in FIG. 8, the rotational speed of the rotary tool 1 at which the joining strength meets the required strength is preferably 1000 to 2500 rpm. If the rotational speed is lower than 1000 rpm, the joining strength is lowered since the agitation is not enough, and if higher than 2500 rpm to the contrary, the joining strength is lowered since the metal texture to be agitated spins idle and is not agitated.

As described above, the materials can be firmly joined without leaving joining marks of the project with smaller investment in equipment than that for the conventional spot welding.

[Shape of Material]

Figure 9:
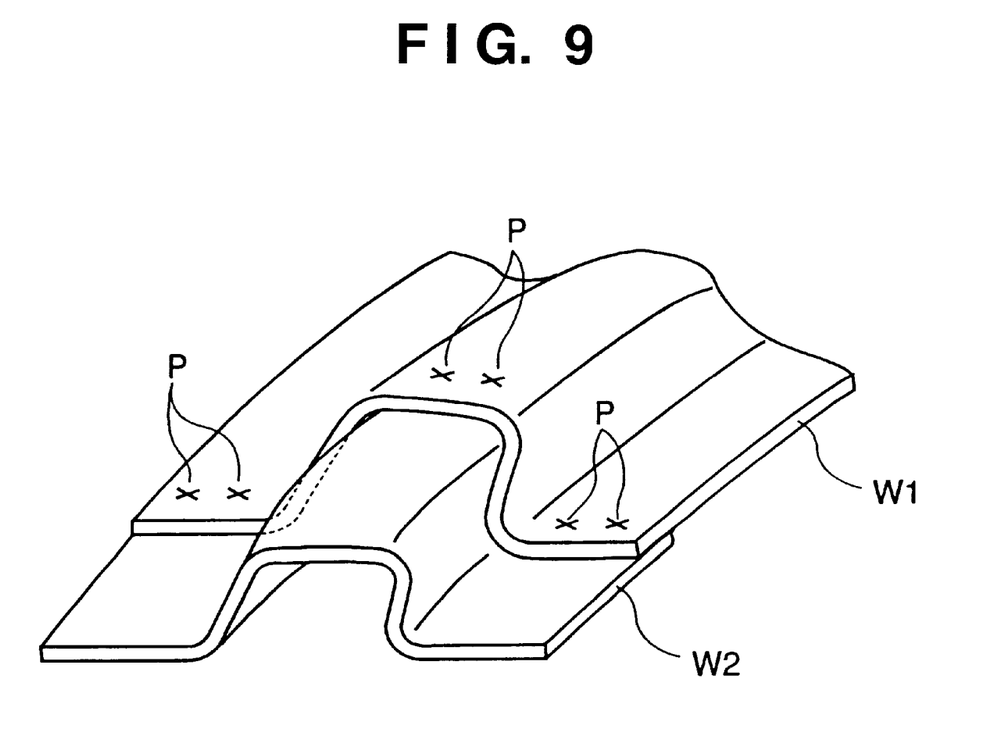
FIG. 9 is a view showing a case of joining body frames of an automobile as materials press formed in advance in a three dimensional shape.
Figure 10:
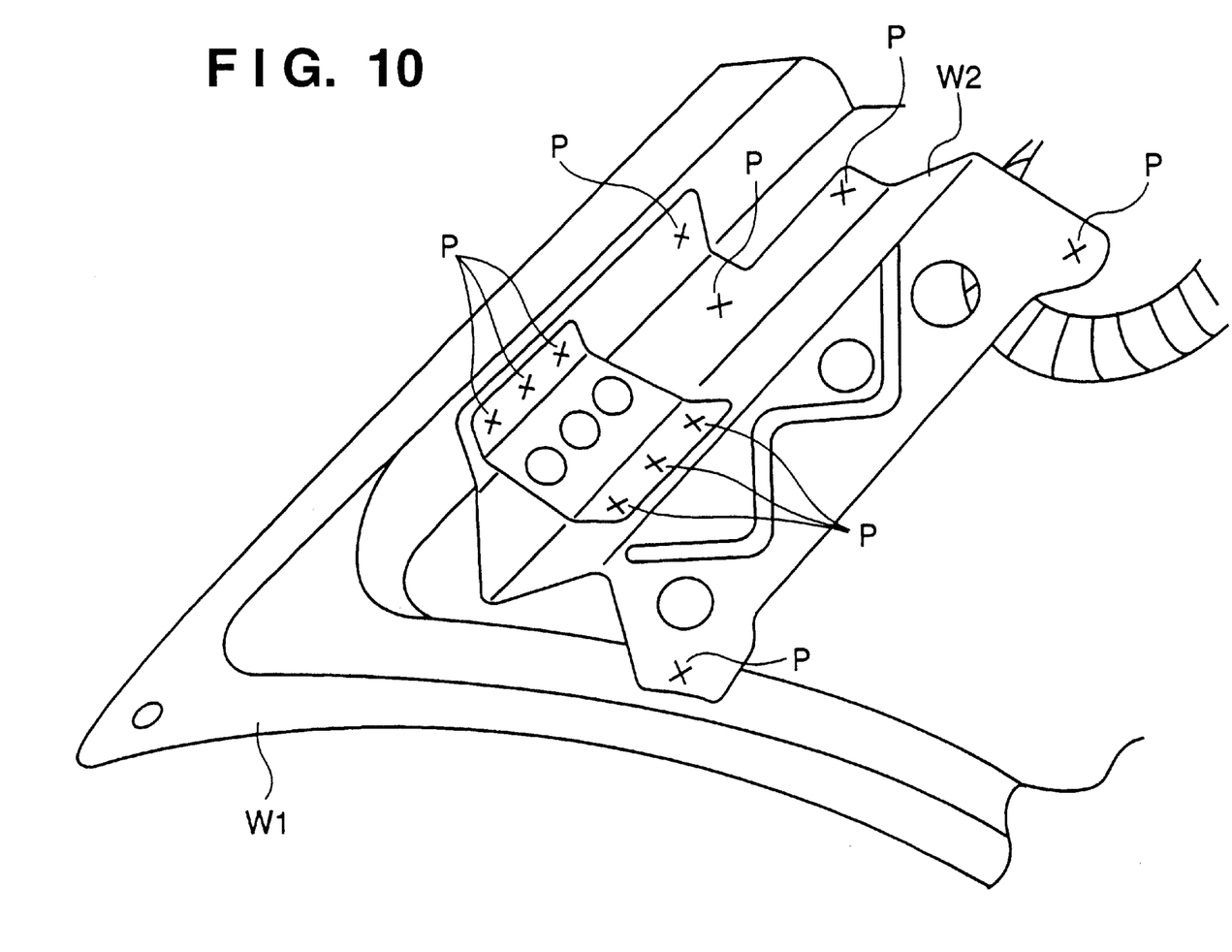
FIG. 10 is a view showing a case of joining a hood and reinforcing member as the materials press formed in advance in the three dimensional shape.

This embodiment is suitable for joining the materials press molded in advance in the three dimensional shape. Namely, like joining of body frames of an automobile shown in FIG. 9 or a hood W1 and reinforcing member W2 shown in FIG. 10, for a plurality of scattered joining portions P in the materials which have the complex three dimensional shapes by press molding and which the rotary tool 1 cannot be continuously moved, welding can be locally made using the joining method of this embodiment, so that joining can be effected even after the materials are press molded.

Figure 11:
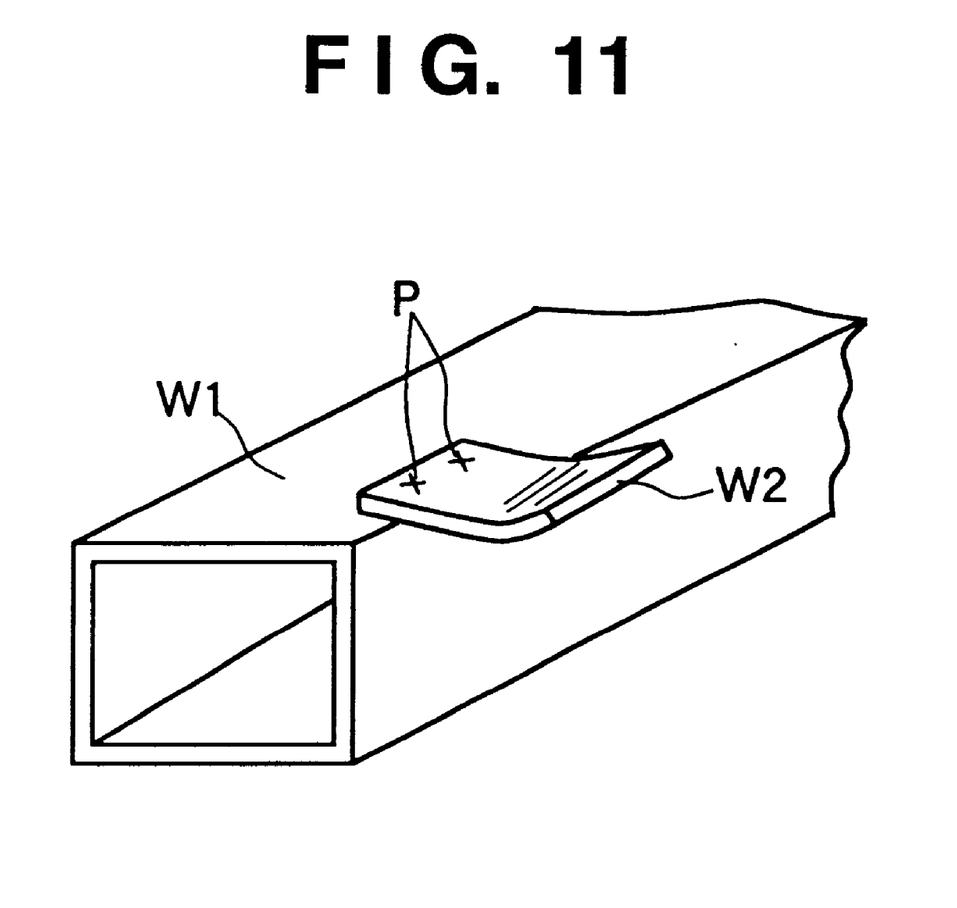
FIG. 11 is a view showing a case of joining a tubular body frame of the automobile having hollow structure with a closed section and a bracket as the materials press formed in advance in the three dimensional shape.

As shown in FIG. 11, in case of joining a tubular body frame W1 of the automobile having hollow structure with a closed section and a bracket W2, they cannot be joined by the spot welding or rivets which requires gripping of the materials, while in the structure where the receiving member 4 is removed from the multiarticulated robot in FIG. 3, joining becomes possible by using the body frame W1 as the receiving member to press the rotary tool 1 on the joining portions. In this case, the rotary tool 1 is pressed on a joining area at the tensile force of approximately 300 kg, which requires selecting the area of the body frame W1 with high rigidity.

[Continuous Joining]

Figure 12:
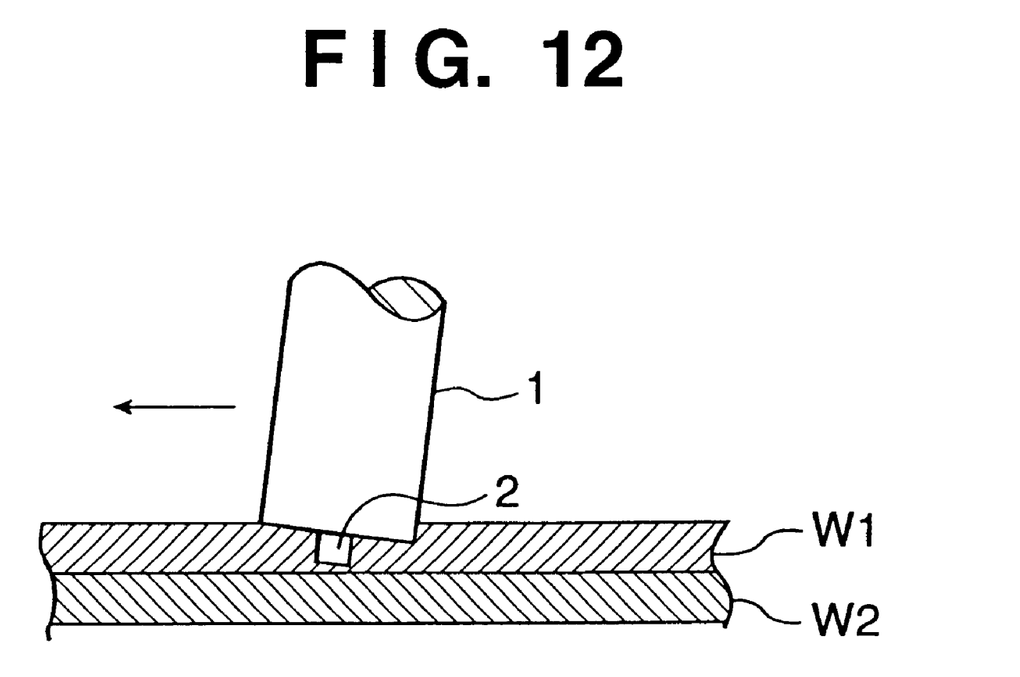
FIG. 12 is a cross sectional view of the metal texture of the joining portion at the time when the rotary tool is moved forward to effect continuous joining.

In the above embodiment, descriptions are made with respect to the spot joining which presses the rotary tool 1 on the joining portion so as not to be moved, while as shown in FIG. 12, joining may be continuously effected with the rotary tool 1 moved forward or oscillated.

If the rotary tool 1 is inclined backward at an angle of approximately 1° in a forward direction when moved forward in FIG. 12, capability of agitation is increased by the inclination compared to vertically pressing the rotary tool 1 on the material W1.

[Modification of the Embodiment]

Figure 13:
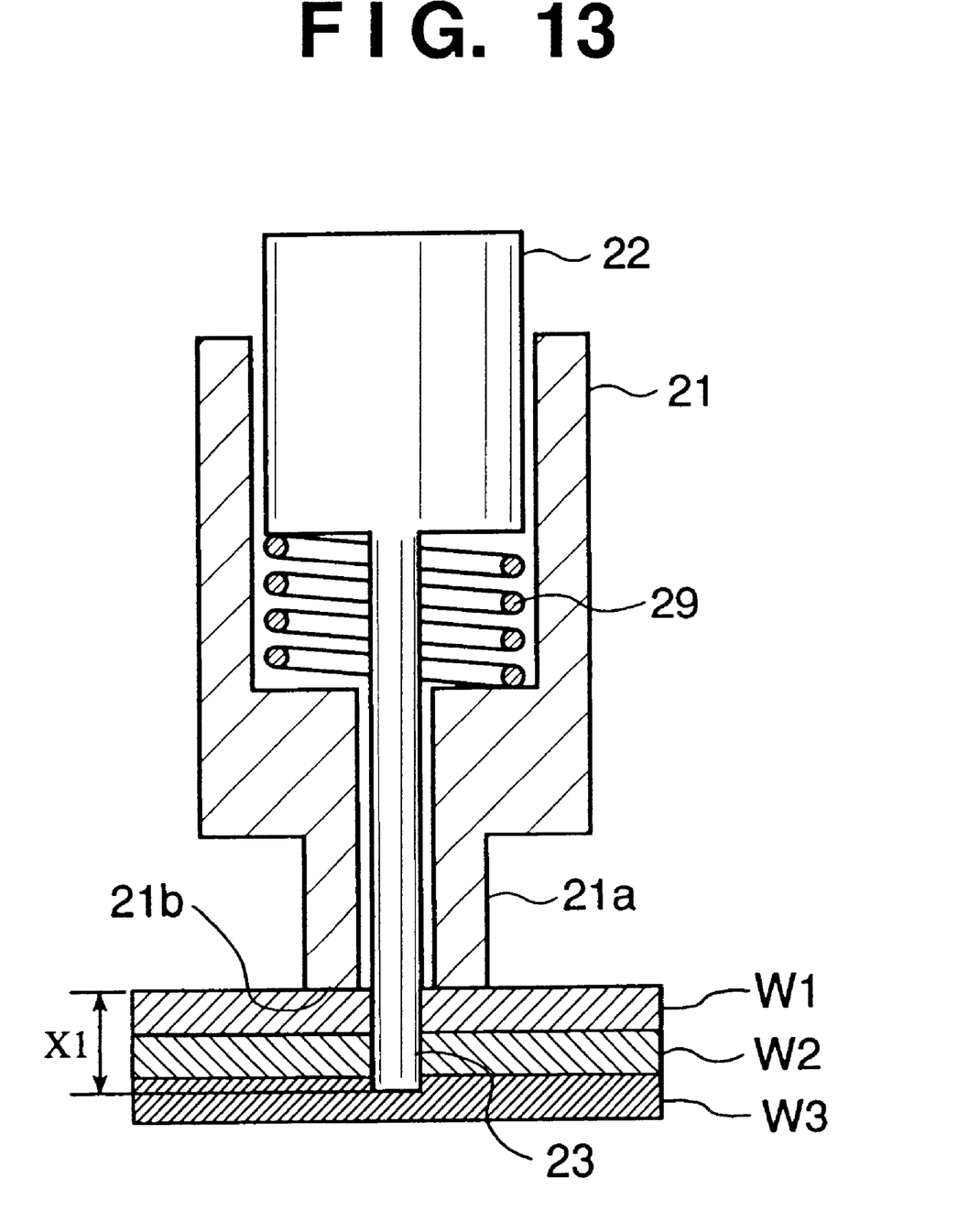
FIG. 13 is a view showing a projection of the rotary tool greatly extended in a modification of the rotary tool according to this embodiment.
Figure 14:
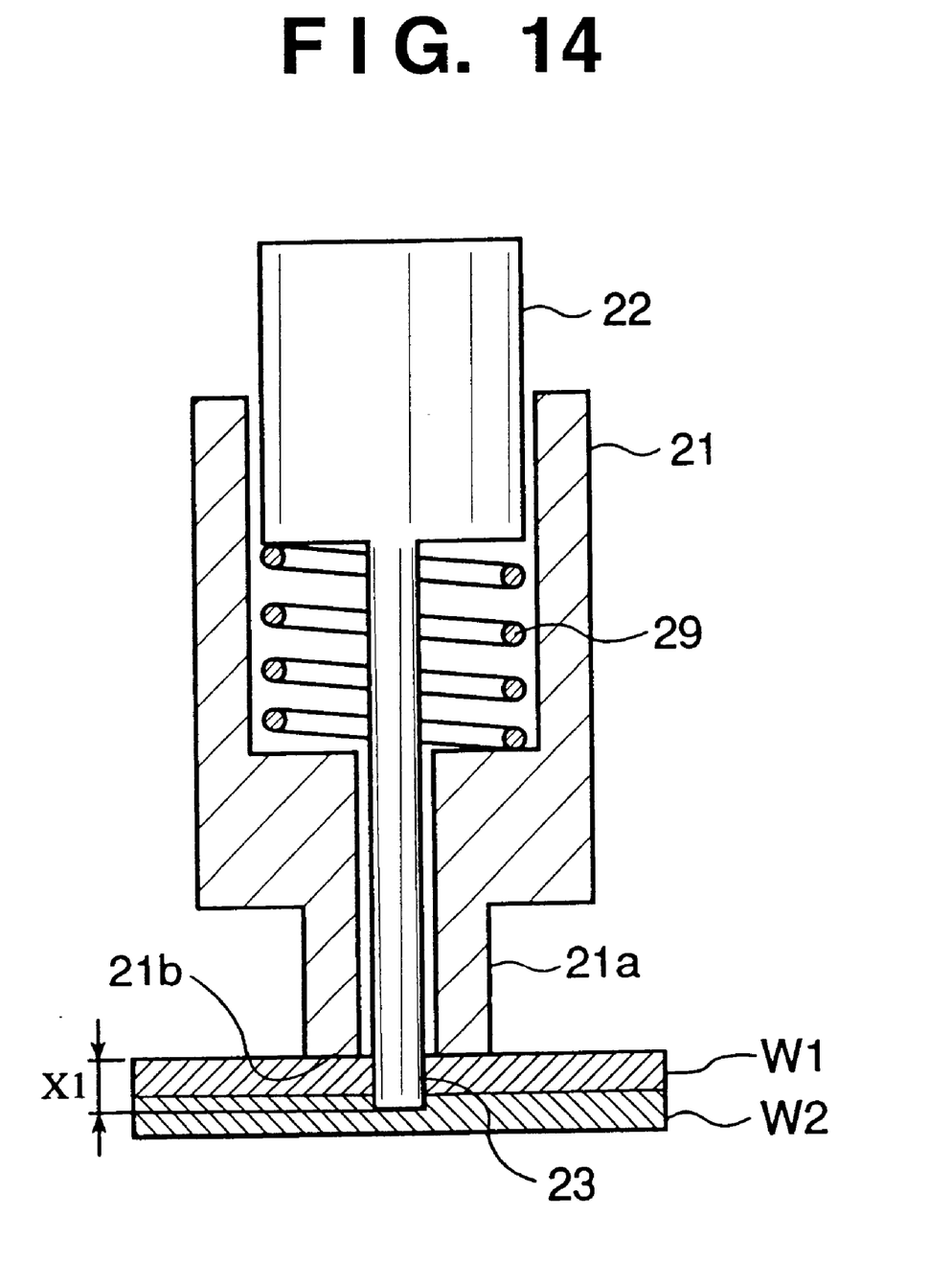
FIG. 14 is a view showing the projection of the rotary tool slightly extended in the modification of the rotary tool according to this embodiment.

FIGS. 13 and 14 show an example of providing a mechanism which makes variable an amount of projection of the projection of the rotary tool as a modification of the rotary tool according to the present invention.

The amount of projection X1 of the projection is determined based on the total thickness of the superposed materials so that a range of application can be enlarged in the case of large total thickness.

As shown in FIGS. 13 and 14, the rotary tool has an outer cylinder member 21 in a shape of a hollow cylinder, an inner cylinder member 22 spline fitted in the outer cylinder member 21 and slidable in an axial direction L1 and a long projection 23 with a small diameter formed on one end of the inner cylinder member 22.

The projection 23 of the inner cylinder member 22 projects outwardly from one end of the outer cylinder member 21 and is pressurized in the axial direction of the outer cylinder member 21 by a spring 29. One end 21a of the outer cylinder member 21 projects such as to surround a periphery of the projection 23 and is formed at its end portion with a shoulder 21b of a circular plane. The projection 23 is positioned in such a manner as to be accommodated in the shoulder 21b and not to project in a condition where no outer force is applied other than the spring.

The outer cylinder member 21 and inner cylinder member 22 are spline fitted to be integrally rotatably driven, the inner cylinder member 22 is axially moved relatively to the outer cylinder member 21 to make variable the amount of projection X1 of the projection 23 which projects from one end of the outer cylinder member 21.

For the projection 23, the amount of projection X1 may be increased when the total thickness of the materials is large since more than three materials are superposed or since the materials have respectively different thickness (see FIG. 13), and the amount of projection X1 may be decreased when the total thickness is small (FIG. 14). The projection 23 is rotatably driven by setting the amount of projection X1 with respect to the outer cylinder member 21 based on the total thickness. This can achieve satisfactory joining even when the plurality of (more than three) materials are superposed or when the materials have respectively different thickness.

The present invention is not limited to the above embodiments and various changes and modifications can be made within the spirit and scope of the present invention. Therefore, to apprise the public of the scope of the present invention, the following claims are made.

What is claimed is:

1. A joining apparatus for joining a plurality of materials in a partly superposed state at a plurality of scattered joining portions, comprising:

a pair of rotary tools arranged opposite each other with the materials therebetween, each of the rotary tools having a projection at an end portion thereof and rotating around an axis thereof;

driving means for rotating the rotary tools;

moving means for moving the rotary tools to each joining portion without contacting the rotary tools to the materials, and moving the rotary tools in a direction of the axis of the rotary tools at each joining portion; and joining means for spot joining the materials by pressing the projections of the rotating rotary tools against each joining portion, inserting the projection in the materials without extending the projection from the materials, and agitating the materials by friction, wherein the rotary tools are rotated in opposite directions.

2. A joining method for joining a plurality of materials at a plurality of scattered joining portions, comprising:

partly superposing the plurality of materials;

providing a rotary tool, a receiving member, and a multiarticulated robot, the rotary tool having a projection at an end portion thereof and rotating around an axis thereof, the receiving member being opposite the rotary tool with the materials therebetween to grip the materials along with the rotary tool, and the robot being movable in three dimensions, the rotary tool and the receiving member being mounted to an end of an arm of the robot;

moving the rotary tool and the receiving member by the robot to each joining portion, without contacting the rotary tool and the receiving member to the materials and in a direction of each respective axis of the rotary tool and the receiving member at each joining portion, to grip the materials with the rotary tool and the receiving member; and spot joining the materials by pressing the projection of the rotating rotary tool against each joining portion, inserting the projection in the materials without extending the projection from the materials, and agitating the materials by friction, wherein the plurality of materials have respectively different thicknesses and the projection of the rotary tool Is pressed from a thinner side of the materials.

3. The joining method according to claim 2, wherein the plurality of materials are formed in advance in a three dimensional shape.

* * * * *

UNITED STATES PATENT AND TRADEMARK OFFICE
CERTIFICATE OF CORRECTION

PATENT NO. : 6,601,751 B2
DATED : August 5, 2003
INVENTOR(S) : Tomoyuki Iwashita It is certified that error appears in the above-identified patent and that said Letters Patent is hereby corrected as shown below:

Column 5,
Line 31, change "project" to -- projection --;

Column 8,
Line 11, change "Is" to -- is -- .

Signed and Sealed this

Twenty-seventh Day of July, 2004

JON W. DUDAS
*Acting Director of the United States Patent and Trademark Office*